United States Patent
Dondini et al.

(10) Patent No.: US 9,081,514 B2
(45) Date of Patent: Jul. 14, 2015

(54) METHOD FOR CONTROLLING OPERATION OF A MEMORY USING A SINGLE WRITE LOCATION AND AN ASSOCIATED MEMORY

(75) Inventors: Mirko Dondini, Catania (IT); Cristina Nastasi, Riposto (IT)

(73) Assignee: STMICROELECTRONICS S.R.L., Agrate Brianza (MB) (IT)

( * ) Notice: Subject to any disclaimer, the term of this patent is extended or adjusted under 35 U.S.C. 154(b) by 873 days.

(21) Appl. No.: 13/312,592

(22) Filed: Dec. 6, 2011

(65) Prior Publication Data
US 2012/0311276 A1 Dec. 6, 2012

(30) Foreign Application Priority Data
Dec. 14, 2010 (IT) .................................. TO10A0994

(51) Int. Cl.
G06F 12/00 (2006.01)
G06F 13/00 (2006.01)
G06F 5/08 (2006.01)

(52) U.S. Cl.
CPC .......................................... *G06F 5/08* (2013.01)

(58) Field of Classification Search
None
See application file for complete search history.

(56) References Cited

U.S. PATENT DOCUMENTS

| 5,463,340 A | 10/1995 | Takabatake et al. |
| 5,611,068 A * | 3/1997 | Giangarra et al. ............ 711/109 |
| 6,516,384 B1 * | 2/2003 | Clark et al. .................. 711/109 |
| 7,107,393 B1 | 9/2006 | Sabih |
| 7,669,086 B2 * | 2/2010 | Gower et al. ................... 714/43 |
| 8,225,034 B1 * | 7/2012 | Golla et al. .................. 711/109 |
| 2004/0006671 A1 * | 1/2004 | Handgen et al. .............. 711/137 |

FOREIGN PATENT DOCUMENTS

| EP | 0 416 513 A2 | 3/1991 |
| WO | 2009/060260 A1 | 5/2009 |

OTHER PUBLICATIONS

Microsoft Computer Dictionary, Mar. 15, 2002, Microsoft Press, 1st edition.*
Italian Search report for IT TO2010A000994, mailed May 7, 2011, pp. 8.

* cited by examiner

*Primary Examiner* — Sean D Rossiter
(74) *Attorney, Agent, or Firm* — Allen, Dyer, Doppelt, Milbrath & Gilchrist, P.A.

(57) ABSTRACT

The operation of a FIFO buffer memory includes writing the data at input to the memory in a single write location, and making the single write location available for writing an input datum with a shift of the datum written in the single write location to another location of the memory. At each operation of writing of an input datum in the single write location, there is scheduled shifting of the datum written therein to another location, without waiting for a new write request, thus eliminating the combinational constraint between the two operations.

22 Claims, 8 Drawing Sheets

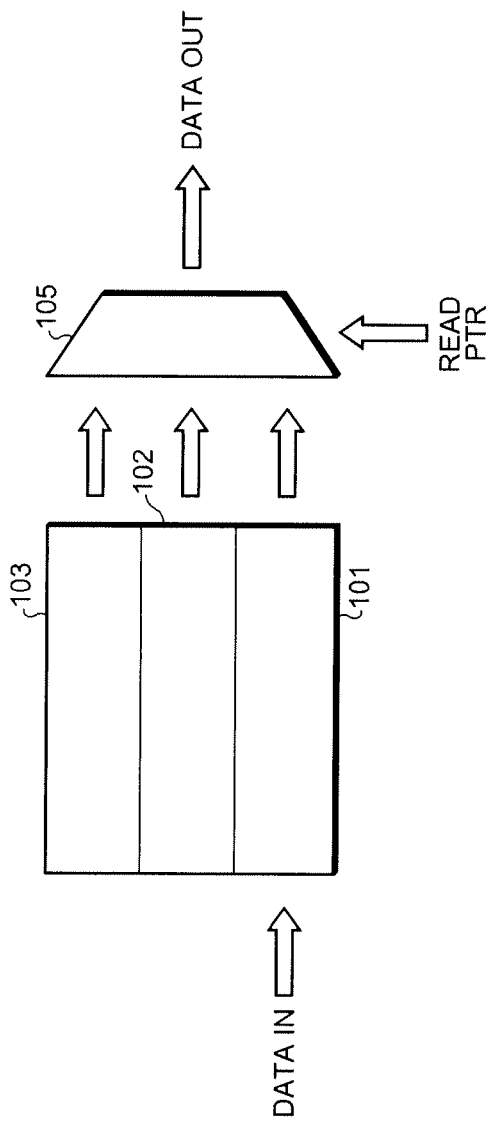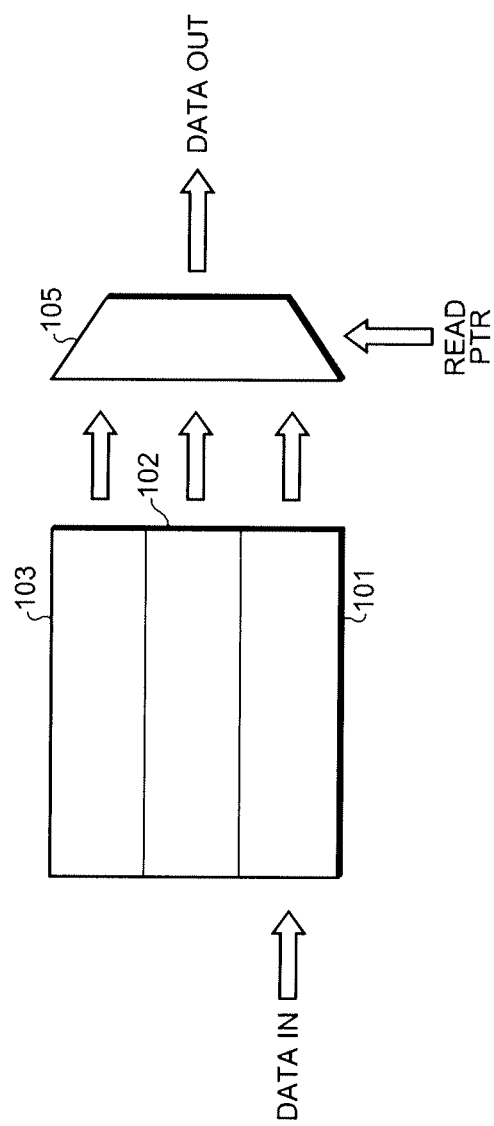

METHOD FOR CONTROLLING OPERATION OF A MEMORY USING A SINGLE WRITE LOCATION AND AN ASSOCIATED MEMORY

RELATED APPLICATION

The present application claims priority of Italian Application No. TO2010A000994 filed Dec. 14, 2010, which is incorporated herein in its entirety by reference.

TECHNICAL FIELD

The disclosure relates to techniques for controlling the operation of memories.

In various embodiments, the disclosure can refer to buffer memories of a FIFO (First-In First-Out) type.

TECHNOLOGICAL BACKGROUND

In the context of the application outlined previously, an example structure is defined as a "circular FIFO micro-architecture" according to the arrangement represented schematically in FIG. 1. This is basically a symmetrical structure, in which a certain number of memory locations is present, designed to receive input data (data in) and to return them at output (data out). The block diagram in FIG. 1 basically represents the structure of the datapath, where the representation of the control function has been omitted for simplicity.

Referring to a purposely simple model in order not to render the treatment excessively complex, a structure comprising three memory locations 101, 102, 103 may be considered, in which the input data are written with a write interface 104 under the control of an input or write pointer (write ptr) and are then read at output with a read interface 105, resorting to a read pointer (read ptr).

Hence, in the case of the structure represented in FIG. 1, it is a symmetrical structure in which the write and read pointers control access to the FIFO buffer for the operations of writing and reading, respectively. In a structure of this sort, there is no dependence between the updatings of the pointers, in the sense that a write operation entails updating only of its respective pointer. The same applies also to the read function, whereas to manage the limit cases of an empty buffer and a full buffer it is possible to refer to a control logic.

In this solution the input data, coming from the write interface, can be guided to any of the memory locations with the write pointer that chooses the location in which to store the input data. This means that the single lane of the datapath presents a so-called "fanout" (i.e., a number of terminal ports to be driven) that is rather high, determined by the number of locations that are to be driven.

An even worse situation arises in the case of the control signal (referred to as "write enable"), which derives in a combinational way from the signals for control of interface flow (write request, write grant). When there is a write operation, said control signal must in fact drive not only the locations of the FIFO buffer, for enabling the one that has been selected by the write pointer, but also all the functional multiplexers that select each bit of the location (the number of which depends evidently upon the size of the memory location).

From a design and implementation standpoint, high fanout values imply the presence of considerable capacitive loads on the paths of the control data signals (datapath/control), which results in a degradation of their timing properties, such as for example the transition time.

As a remedy to possible violations, the tools for design and synthesis of digital circuits (to which this function is normally entrusted) use a technique consisting of automatic building of a tree network with technological cells having buffer functions for generating a number of copies of the same input signal and dividing the overall fanout between them.

This solution is schematically presented in FIG. 2, where appearing on the left is the fanout structure and on the right the corresponding tree structure of buffer cells on a generic number n of levels.

In the implementation step, if recourse is had to the solution referred to herein, on the write signals a delay is introduced due to their propagation through the elementary buffer cells provided for solving the problem of fanout. It is, in other words, a sort of implementation delay that must be distinguished from the delay introduced by the functional logic and that is due to the cells inserted as a remedy to the possible violations of the design rules.

FIG. 3 hence corresponds to the practical implementation of the scheme represented in general terms in FIG. 1 where in fact there may be noted the memory locations of the buffer 101, 102, 103 (that will be assumed organized on N bits) with the representation in greater detail of the write section or interface 104, which comprises trees of the buffer 104a that are to receive on the one hand the input data (data in) and on the other, starting from a logic 106, the control signals corresponding to the control signal (write enable), to the write pointer, and to the action of control of the logic 106 exerted by a finite-state machine (FSM). In the same FIG. 3 the references 104b designate the functional multiplexers that select the bits of the various locations 101, 102, 103 (and the number of which depends evidently upon the size, i.e., upon the number N of bits, of said memory location).

FIGS. 4 and 5 refer to a micro-architecture constituting an improvement to the solution described previously with reference to FIGS. 1 to 3. The solution of FIGS. 4 and 5 can be defined as a fast-write FIFO micro-architecture, in which the performance of the signals of the datapath are improved by enabling writing only in a single write location selected, thus avoiding having to guide the input signals towards different memory locations of the FIFO buffer.

For example, the aforesaid single write location can be the location "0", designated by 101 in the figures, even though as single write location it would be possible to choose a different location.

As may be appreciated from a direct comparison of FIGS. 1 and 3, on the one hand, and of FIGS. 4 and 5, on the other, where in all these figures the same references are used to designate entities that are identical or equivalent to one another, the solution of FIGS. 4 and 5 does without the write pointer on the write side, whereas the read pointer remains (with the corresponding interface 105) on a read side.

The structure of FIG. 4 is clearly asymmetrical, and for managing the write operation on a single location kept fixed (for example, the location "0" designated by 101) an operation of shift of all the other locations (102 and 103, in the example considered herein) of the FIFO structure is envisaged. With reference to the location "0" as write location, these operations of shift are in general operations of "shift up", carried out whenever there is a new writing operation so as to prevent the data previously written from being overwritten.

Accordingly, it is envisaged to update the read pointer thus selecting (according to the FIFO logic) the "oldest" data that have not yet been read. This operating mode enables a correct propagation of the data to the reading side, without any loss of information.

In brief, the solution to which FIGS. 4 and 5 refer bases its operation on the criterion of:

writing the data D1, D2 at input to the memory in a single write location (the location 101, in the example considered herein) from among the plurality of locations 101, 102, 103 of the memory; and making the (single) write location 101 available for writing an input datum with a shift of the datum previously written in said single write location 101 to another of the locations 101, 102, 103 of the memory.

The corresponding implementation, schematically illustrated in FIG. 5, presents as a main advantage the fact of eliminating the dependence of the input datapath (data in) upon the fanout deriving from the number of locations. In practice, in the solution of FIGS. 4 and 5, there are no violations at the level of transition of the signals deriving from high capacitive loads so that there is no degradation of the levels of performance in terms of timing deriving from the insertion of the tree of the buffer-cell network described previously.

The solution of FIGS. 4 and 5 does not, however, solve the problem regarding the write control path linked to the fact that the write-enable signal (write enable) must drive all the locations so as to enable writing of the new data and, in addition, simultaneous shifting of all the locations in order to prevent overwriting. This signal hence still has a number of cells to be driven that depends upon the number of the locations of the FIFO structure and upon the size of said locations.

Once again, at the level of design and synthesis of the circuit, it is necessary to insert a tree structure of the buffer cells as a remedy to the violations of fanout, which has an adverse impact on the timing performance of the corresponding micro-architecture as regards the control part of the write interface.

This situation is highlighted in FIG. 5 where it may be noted that the write-enable signal must in any case drive the logic 106 and, through the network of buffer cells 104, the functional multiplexers 104b to guarantee the write operation in a correct way and the consistency of the data already stored in the memory locations.

A solution such as the one illustrated in FIGS. 4 and 5 proves satisfactory with datapaths that are critical in terms of timing on the write side, but not with a dataflow-control path that is critical from the standpoint of timing given that the write-enable signal is in the last resort a combinational result thereof.

From what has been outlined previously, it emerges that FIFO buffer structures of the type described above, with flow-control capacities, do not present ideal modalities of operation, moreover if, for example, the critical aspects of timing are considered, which, above all, do not normally appear evident at an architectural level when the allocation and sizing of the memory locations is defined according to the design targets, but emerge, instead, during the implementation step, when design-dependent variables (fanout, capacitive load, transition time, propagation delay) are taken into account, and are such that the dimensions of the FIFO buffer (expressed in terms of number of locations and size in bits of the individual location) can produce misalignments in the timing performance in practice achieved as compared to the performance expected in the design stage.

The object of the invention is to provide a solution that will be able to overcome said drawbacks.

SUMMARY OF THE INVENTION

According to the invention, said object is achieved thanks to a method having the characteristics recalled in a specific way in the ensuing claims. The invention also regards a corresponding system, as well as a computer program product (which can be used, for example, to provide a model for purposes of evaluation of the behavior and of validation in terms of performance) that can be loaded into the memory of at least one computer and comprises portions of software code that are able to implement the steps of the method when the product is run on at least one computer. As used herein, reference to such a computer program product is understood as being equivalent to reference to a computer-readable means containing instructions for control of the processing system for co-ordinating implementation of the method according to the invention. The reference to "at least one computer" is evidently meant to highlight the possibility of the present invention being implemented in a modular and/or distributed form.

The claims form an integral part of the technical teaching provided herein in relation to the invention.

In various embodiments, the disclosure enables a fast write operation of a FIFO buffer to be obtained in a way independent of the number of the locations comprised in the FIFO structure, which enables the desired performance to be achieved irrespective of the dimensions of the component and of the applicational requirements, without any conditioning as regards the timing performance of the component, as may occur in solutions such as the ones described previously.

In various embodiments, it is possible to reduce the impact on the timing performance at the level of instantiation of FIFO buffers, for example, at the interfaces of blocks or of so-called IPs (Intellectual Property), for example ones of a synchronous type and at high frequency, which exchange data with one another on the basis of flow-control protocols.

In various embodiments, this can apply in contexts in which a pure function of pipelining of the data is not sufficient to satisfy the requirements of maximum traffic bandwidth.

In various embodiments, it is possible to solve the problem of the dependence of the timing performance upon the number and the size of the locations of the FIFO structure, which are parameters that are liable both to affect the fanout of the interface-control signals, with the risk of adding capacitive loads, and to give rise to violations at the level of transition times.

In various embodiments, it is possible to eliminate the aforesaid dependence upon the number of the locations of the FIFO structure by modifying the modalities of control of the shift operations in fast-write structures of a current type.

In various embodiments, it is possible to eliminate the dependence of a combinational type between the signals that govern the shifts and the signals that govern the write operation.

In various embodiments, this result can be achieved by eliminating the effect described previously as regards the buffer networks, causing timing of the FIFO buffers not to change with the number of the locations.

In various embodiments, it is thus possible to choose the optimal dimensions of the FIFO buffers according to the applicational requirements without this entailing timing problems, with the same area occupation or even with a lower area occupation.

Various embodiments can be applied in all the contexts where there are used memory components (such as buffers) with FIFO structure of a configurable type with a capacity for managing flow control of an embedded type with the presence of write interfaces that are able to manage control signals and data with time constraints that are very stringent with respect to the reference timing cycle.

Various embodiments are suited for being used, for example, as input stage of synchronous interfaces of IPs or components, within the so-called Systems on Chip (SoC) or within application-specific integrated circuits (ASICs), ensuring a functional uncoupling in addition to the improvement in terms of timing performance. This enables an easier and more efficient integration without this leading to conditioning in a limiting sense the IP or the fastest component.

Various embodiments are suited for being used as element of a complex re-timing stage in components of the pipeline type where there are required mechanisms of flow control in order to guarantee the performance in terms of traffic over the entire passband, cases in which the simple re-timing stages prove inadequate.

Various embodiments are suited for being used as interconnect IPs for the implementation at the level of Network on Chip (NoC) and of conversion components for protocol or bus-size conversions.

In brief, various embodiments can afford, at least in part, the following advantages:

elimination of the dependence of a combinational type between the control signals of a write-enable type generated in write interfaces with critical characteristics in terms of timing and the actions of updating of the locations of the FIFO buffer (said updating actions, in the solutions discussed in the introductory part of the present description, being performed via an enable function of a selective type or else via a shift);

possibility of the tree networks of buffer cells envisaged for the write-enable signal in order to remedy the violations at the fanout level being controlled with tools for design/synthesis of the circuits and depending only upon the size of the respective location of the FIFO buffer (i.e., upon the number of bits of each location);

timing performance on the data and control signals of the write interfaces rendered independent of the number of locations of the FIFO buffer;

easier integration of the IPs and of the components, which is due both to timing performance rendered less critical and to the fact that the changes of the configuration of the dimensions of the FIFO buffer do have not any effect at the timing level; and possibility of reducing the requirements in terms of optimization at the level of synthesis of the circuit and of back-end tools in order to adapt the timing constraints on the interfaces where these buffers are used, a fact that results in benefits at the level of area occupation and of management of the connections from the design standpoint, in particular as regards the runtime of the corresponding tools.

The basic principles that underlie various embodiments can be summarized as follows:

identification of a way for eliminating the combinational functional dependence between the operations of write and shift in fast-write FIFO micro-architectures (thus providing an intra-cycle uncoupling between the write and shift operations);

there is no need of performing the operation of shift on the locations of the FIFO buffer that aims at preventing overwriting of the data previously written in the write location is only when a new writing operation takes place (i.e., when the intra-cycle combinational approach "shift when overwrite" is adopted);

each write operation on the FIFO structure at a given clock cycle (e.g., N) scheduling a shift operation on the next clock cycle (e.g., N+1) without waiting for the subsequent write operation (hence adopting an inter-cycle sequential approach of the "write then shift" type).

BRIEF DESCRIPTION OF THE DRAWINGS

The invention will now be described, purely by way of non-limiting example, with reference to the annexed drawings, in which:

FIGS. 1 to 5 have already been described previously as prior art solutions;

FIG. 6, which is on the other hand in itself identical to FIG. 4, illustrates the general architecture of embodiments;

DETAILED DESCRIPTION

In the ensuing description, various specific details are illustrated aimed at an in-depth understanding of the embodiments. The embodiments may be provided without one or more of the specific details, or with other methods, components, materials, etc. In other cases, known structures, materials, or operations are not shown or described in detail to prevent the various aspects of the embodiments from being obscured.

Reference to "an embodiment" or "one embodiment" in the framework of the present description is meant to indicate that a particular configuration, structure, or characteristic described in relation to the embodiment is comprised in at least one embodiment. Hence, phrases such as "in an embodiment" or "in one embodiment" that may be present in various points of this description do not necessarily refer to one and the same embodiment. In addition, particular conformations, structures, or characteristics can be combined in any adequate way in one or more embodiments.

The references used herein are only provided for convenience and hence do not define the sphere of protection or the scope of the embodiments.

Figure 1:
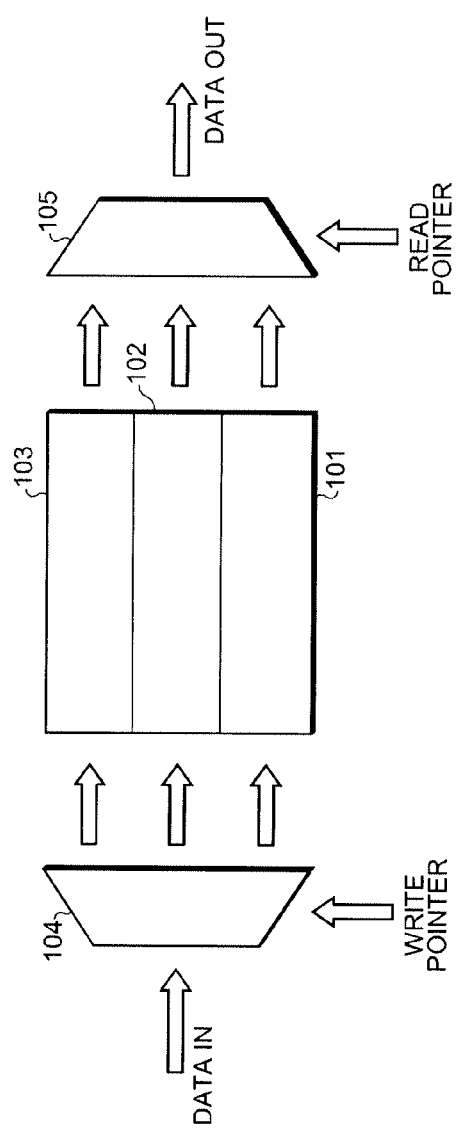

FIG. 6 illustrates—according to modalities substantially similar to those already used with reference to FIGS. 1 and 4—the structure of a FIFO memory architecture (buffer) according to various embodiments.

In FIG. 6 and in the subsequent figures, parts or elements that are identical or equivalent to those already described previously with reference to FIGS. 1 and 4 are designated by the same numbers or by the same references. In particular, the structure represented in FIG. 6 is in itself identical to the structure represented in FIG. 4. Consequently, also in the case of the structure considered by way of example in FIG. 6, in these embodiments the operation of writing of input data (data in) takes place only on one of the locations of the FIFO structure.

Once again, reference will be made herein by way of non-limiting example, to write operations that are performed (only) in the first location (location "0") designated by 101. From this fact it follows that the operations of shift which will be described more fully in what follows occur in the form of shift-up operations.

Of course, the choice of the location "0" as single write location and of the shift-up operation is provided purely by way of example in no way limiting the scope of the description. Various embodiments could in fact use as write location a location different from the location "0" designated by 101, and the operations of shift described could assume the nature of both shift-up and shift-down operations. The fact of referring to the location "0" and to shift-up operations presents the advantage of simplifying the illustration of embodiments provided by way of non-limiting example.

For the same considerations set forth above, these choices provided by way of example present the advantage of driving the reading side through a controlled read pointer (read ptr) of a simple type structured so as to choose for reading the oldest data of the FIFO structure that have not yet been read.

Figure 7:
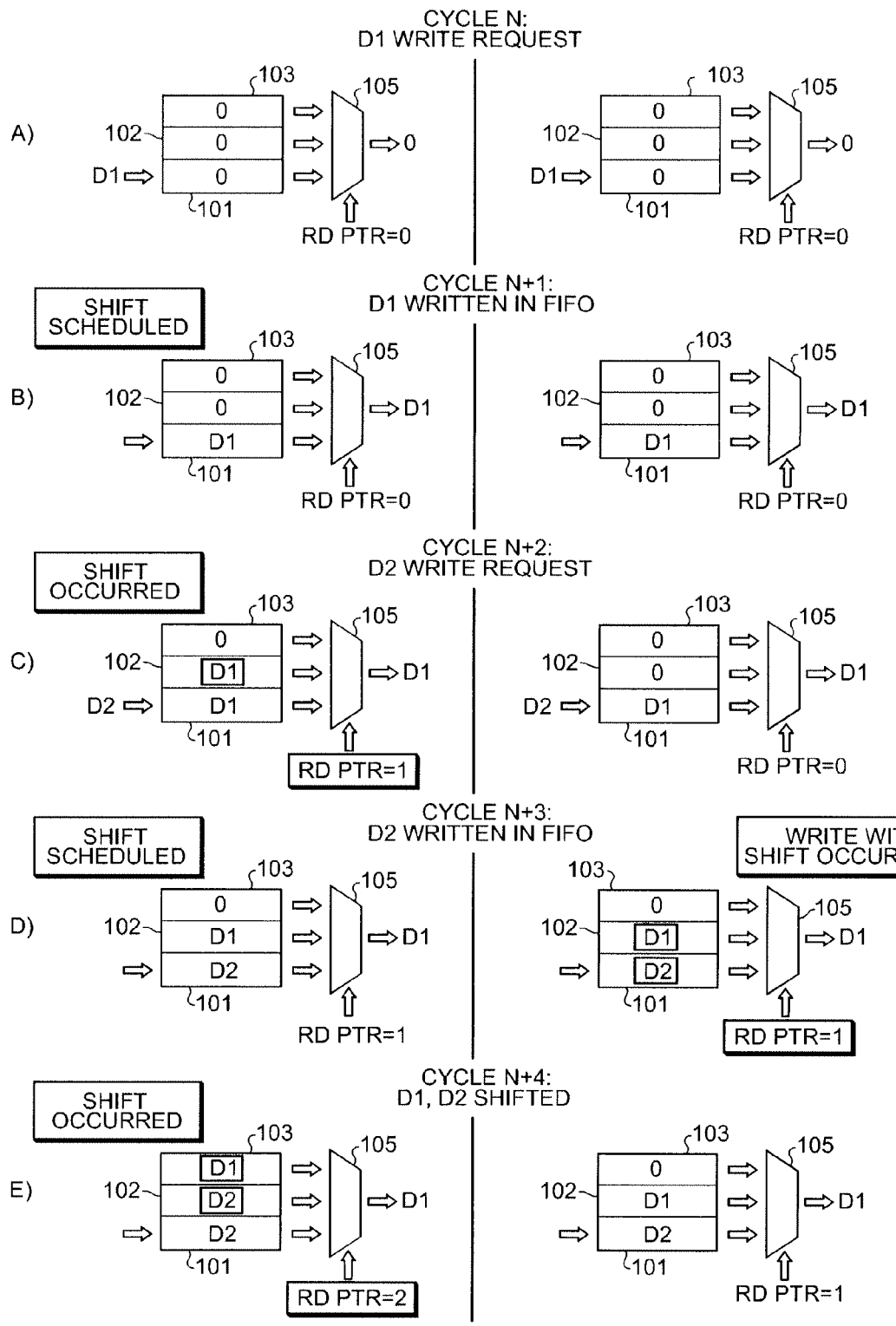
FIG. 7 illustrates in a comparative way operation of embodiments.

FIG. 7 sets in comparison the behavior of various embodiments (on the left in the figure) with operation of a solution substantially corresponding to the one described previously with reference to FIGS. 4 and 5, through a sequence of clock cycles N, N+1, ..., N+4, which refer, from top down, to parts of FIG. 7 denoted by a, b, c, d and e.

Consistently with the scheme set out previously, also the representation provided by way of example in FIG. 7 regards a situation in which the input data D1, D2, etc. are loaded once again in the same location of the buffer structure, and in particular in the location "0" designated by the reference 101. Accordingly, the shift operations which will be referred to in what follows are operations of shift from bottom upwards ("step-up shift").

Once again, it is recalled that said representation is provided purely by way of example, in so far as loading of the data could also occur in a different location, with the consequence that the operations of shift could occur both upwards and downwards.

The representation of FIG. 7 highlights that, in various embodiments, it is possible to manage advantageously the required shift.

Figure 5:
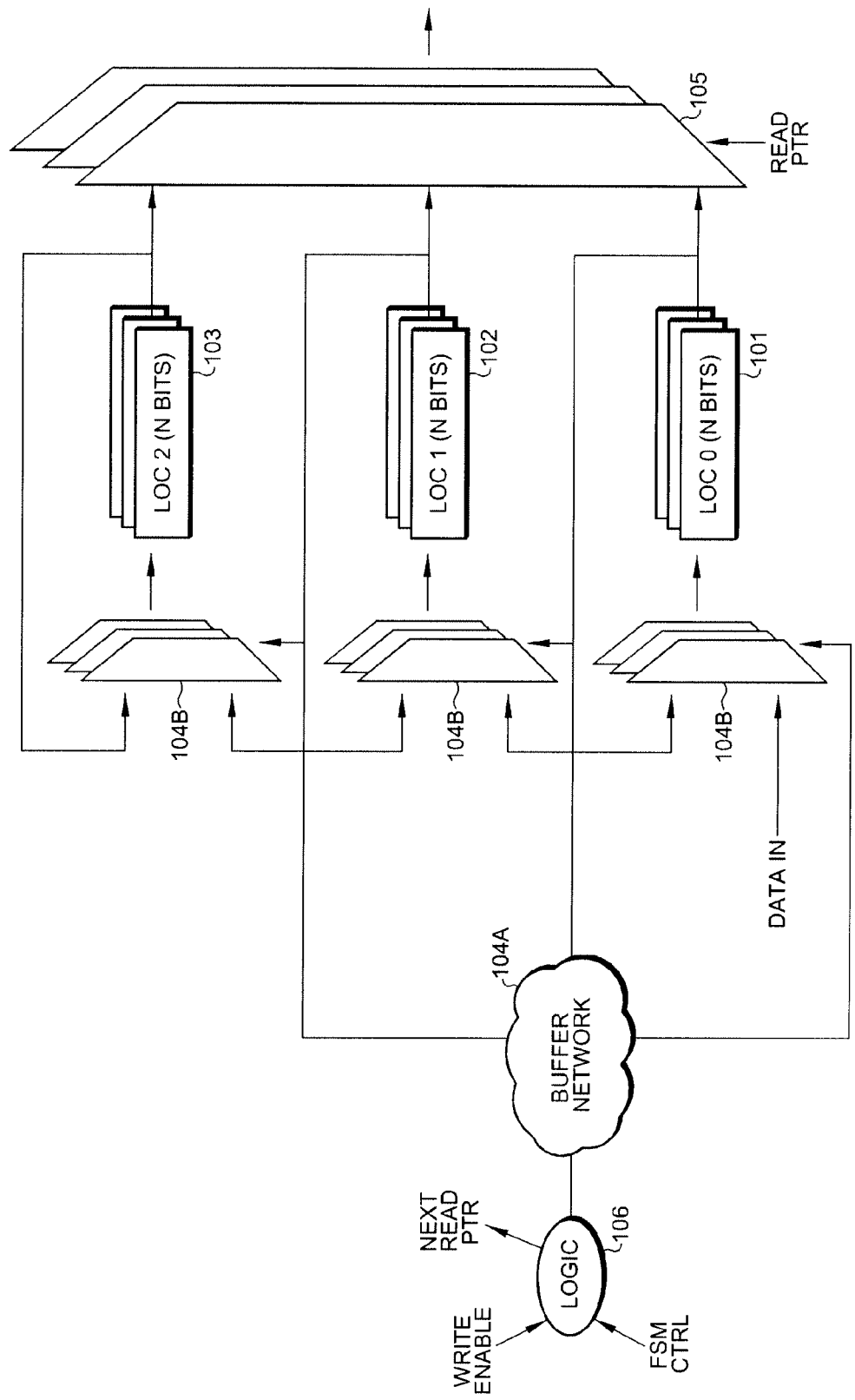

As has already been said, in solutions corresponding to those of FIGS. 4 and 5 the shift operation, which aims at preventing an overwriting of the data, with consequent loss of information, is envisaged in the same cycle as the subsequent input write operation. It introduces, however, a functional dependence of a combinational type between the two operations.

Instead, in various embodiments as the ones considered here (on the left in FIG. 7) each operation of writing in the FIFO buffer schedules a shift in the next clock cycle, without any need for waiting for the next input write operation, which causes the combinational dependence to cease.

This procedure can be viewed as a sort of look-ahead approach to prevent any possible overwriting of the memory locations, based, however, of the observation of the fact that there is no need to wait for the condition of overwriting before freeing the write location.

In particular, the comparison of FIG. 7 regards the same type of operations performed at input, and in particular two non-adjacent (i.e., non-back-to-back) writing operations so as to highlight the different behavior as regards control of the locations of the FIFO structure. Of course, it is a representation that is purposely simplified to facilitate an understanding of the embodiments. In a scenario of real application the read and write operations can be performed in any cycle. In this connection, it will on the other hand be appreciated that various embodiments do not impose any limitation in this regard.

In particular, parts-a) and -b) of FIG. 7 highlight that the (first) operation of writing of a datum D1 in the location 101 is obtained in an identical way in the two solutions set in comparison with a write request (D1 write request) at a generic clock cycle N, whereas, in the next clock cycle N+1, the write operation is completed and the datum is available in the FIFO at the location 101 (D1 written in FIFO).

Part-b) of FIG. 7, corresponding to the cycle N+1, highlights the fact that, in various embodiments (on the left in the figure) it is possible to schedule simultaneously an operation of shift (shift scheduled) that is to be made at the next cycle N+2 (shift occurred).

In this way, in the example of embodiment considered here, the location 101 (where, once again by way of example, that the write operations are assumed to occur) is available at the next cycle N+3 (part-c) of FIG. 7) for writing a new input datum D2 (D2 written in FIFO) following upon a respective request (D2 write request) that has arrived previously (cycle N+2). In this regard, it will be appreciated that the location 101 can already store new data at the cycle N+2 if the write request is made at the cycle N+1.

In the example here considered, the shift operation represented on the left in part-c) of FIG. 7 has been assumed to occur without an erasure of the write location 101, envisaging, instead, that the shift of the datum D1 already written in the location 101 occurs by "duplicating" the datum D1 in the location 102 (here adjacent to the location 101).

Even though the location 101 is not in itself cleared, the next operation of writing of the datum D2 in the memory location 101 can occur freely, without any risk of loss of information, in so far as the datum D2 overwrites a datum that is no longer of interest: the same datum has been shifted into the location 102 by duplicating it, i.e., by copying it in said location.

From part-d) of FIG. 7 on the right, it may, instead, be seen that in the operating solutions according to the solutions described previously with reference to FIGS. 4 and 5 the two events of writing of the "new" datum D2 in the location 101 and of shifting of the "old" datum D1 into the location 102 inevitably collide, in so far as, to prevent undesirable phenomena of overwriting with loss of information, in concomitance with the request for writing a new datum, the control logic of the FIFO buffer must envisage the shift operation to prevent overwriting; this produces the combinational dependence between the write-enable signal and updating of all the locations of the FIFO buffer: namely, writing can occur only after the shift has been carried out.

Part-e) on the left in FIG. 7 highlights the fact, in various embodiments, the operation of writing of the datum D2 carried out in the cycle N+3 (D2 written in FIFO) is accompanied in the same cycle by a scheduling of a shift (shift scheduled), which is then performed in the cycle that is then to follow, i.e., in the cycle N+4, with the datum D1 that is shifted from the location 102 to the location 103 and the datum D2 that is shifted (e.g. duplicated) from the location 101 to the location 102 so that the location 101 is again made available for writing a new datum that might arrive in the future.

Once again it is assumed by way of example that the memory location 101 can be made available for writing a new datum without the need for it being cleared, it being possible simply to store in the memory location 101 an old datum that has been by now duplicated and consequently can be overwritten by a new input datum without loss of information.

It will be appreciated, instead, that in the solutions operating according to the criteria illustrated with reference to FIGS. 4 and 5, the aforesaid shift operation will intervene only at a moment subsequent to the arrival of a new datum to be written. All this, however, gives once again rise to a situation of conflict between the operation of writing of the new datum and the operation of shift to be performed in order for the new datum to be written in the memory location 101 without giving rise to any loss of information.

FIG. 7 on the left highlights moreover the fact that, in various embodiments, the read operation can be rendered altogether uncorrelated from and independent of the write operation.

In brief, in the solutions according to FIGS. 4 and 5 (part on the right in FIG. 7) there is a writing of a datum and then it is necessary to wait for a new write operation to provide the shift necessary to preventing overwriting and hence loss of information. Instead, various embodiments (part on the left in FIG. 7) can envisage scheduling of a shift of location in the case where there is a write operation so as to make the write location (corresponding, in the examples here considered, to the location 101) immediately available for writing during a subsequent cycle.

In various embodiments, this control mode on the write side can be co-ordinated with the read operations so as to maintain consistency of the data available at output.

In various embodiments, it is hence possible to eliminate the combinational dependence between write and shift operations.

As a result of the foregoing is the fact that, in various embodiments, the write-enable control signal arriving on the write interface does not drive directly updating of all the locations of the buffer, but only the location 101 requested for writing in so far as the shift operation can be controlled by a finite-state machine 108 associated to the FIFO structure to which this task is entrusted.

Figure 8:
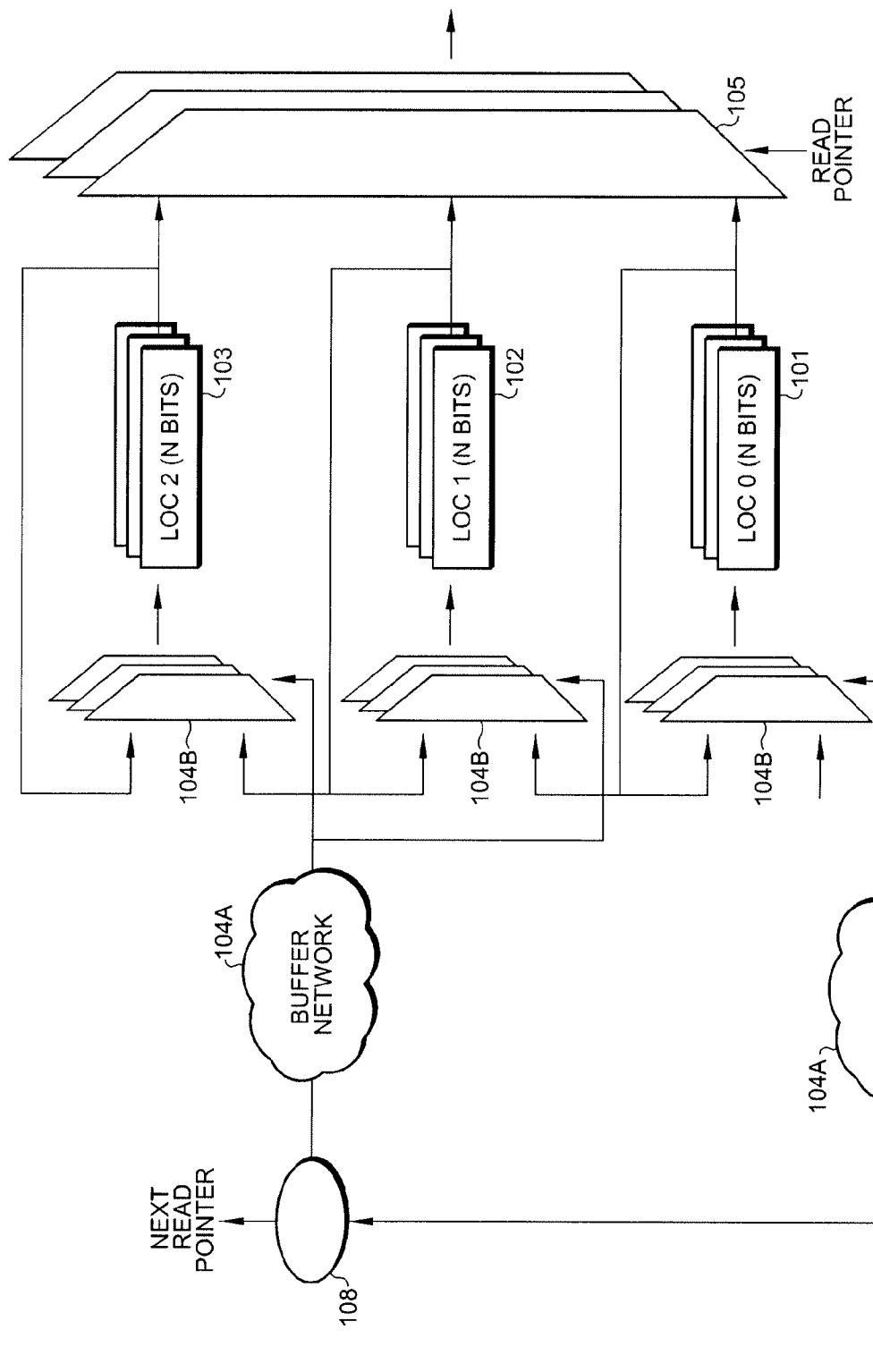
FIG. 8 illustrates, according to modalities substantially similar to the modalities of FIGS. 3 and 5, characteristics of embodiments.

This characteristic is better highlighted in FIG. 8, which could be directly compared with the scheme of FIG. 5.

Whereas the buffer network 104a of FIG. 5 acts on all three locations 101, 102 and 103 via the multiplexer 104b, in the scheme of FIG. 8 the homologous buffer network 104a acts only on the memory locations 102 and 103 different from the write location 101, whereas, instead, a buffer network 104d is envisaged, which manages the write operations precisely on the write location 101.

Figure 3:
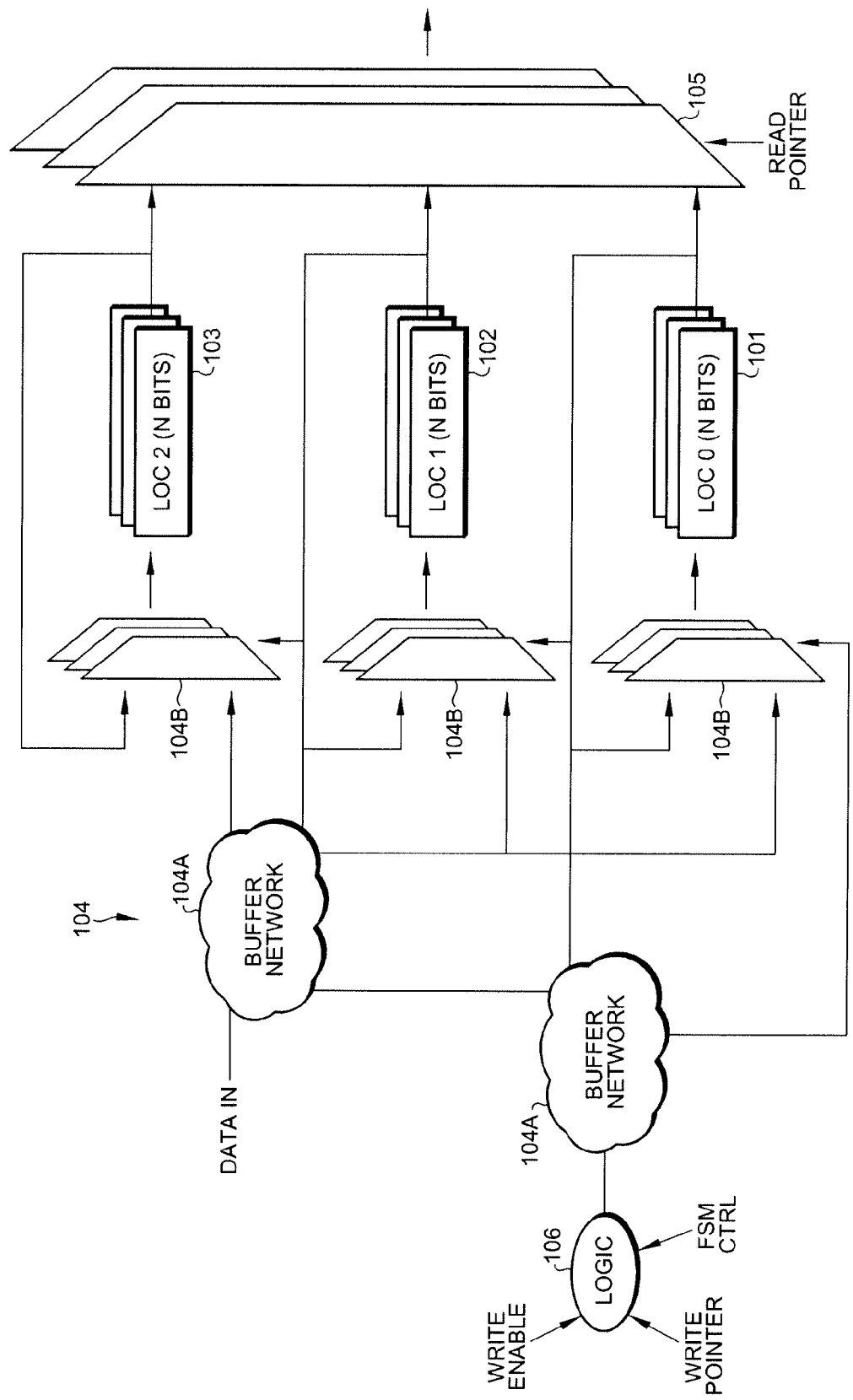

In this regard, it is once again possible to compare the solution of FIG. 8 with the scheme of FIG. 3, where the two buffer networks designated by 104a both operate on all three memory locations having to manage in each of said memory locations both the shift operation and the write operation.

The scheme of FIG. 8 shows that in various embodiments the write-enable signal is loaded only by the fanout cells corresponding to the write location (i.e., by the buffer network 104d associated to the write location, which, in the example here considered, is the location 101).

At the same time, the network 104a that manages the shift operations can be reduced in effect to a pair of cells subjected to control of a finite-state machine 108, which, on the one hand, schedules the shift and, on the other, updates the control state. In this way, at the level of design and synthesis tools, in order to take into account the violations at the transition level, it is possible to adopt a smaller buffer-tree structure, which reduces the delay of propagation that affects the control signal.

In various embodiments, the finite-state machine 108 can drive the locations 102, 103 different from the write location 101 thus managing their updating via shift operations, uncoupling the cycle from the write operation and hence from the corresponding interface.

In fact the corresponding fanout is loaded on the shift signal controlled by the finite-state machine 108, and the tree network, albeit still present, is such that the entire clock cycle available for compensating the delay of propagation introduced by the buffer network (in other words the shift signal controlled by the finite-state machine 108) does not present critical aspects of timing as in case of the interface signal.

In this way, the control of writing is rendered independent of the number of locations present in the FIFO structure (once again it is recalled that the reference to three locations 101, 102, 103 is an example that is extremely simplified for clarity of illustration) ensuring that the performance in terms of timing will be maintained in a practically identical way also in the presence of different FIFO configurations.

In various embodiments, the finite-state machine 108 can undertake also control of the level of filling of the FIFO structure.

When the last write operation possible is executed (which is considered as being the last possible since there remains available for writing only the location in which the write operation is normally carried out—hence only the location 101, in the example here considered—in so far as all the other locations contain valid data that have not yet been read), the finite-state machine 108 would in fact schedule a shift operation that cannot take place in the next cycle in so far as the FIFO structure is full.

In various embodiments, the finite-state machine 108 can be thus configured in such a way as to have, with respect to a homologous finite-state machine that could be used in solutions of the same type as the ones represented in FIGS. 4 and 5, a new state that makes it possible to take into account the fact that it has not been possible to provide a shift that may potentially have been requested so that said shift remains "pending".

In said conditions, as soon as there is a reading operation (the only admissible operation when the FIFO structure is completely full), the finite-state machine 108 is able to update the locations and the read pointer accordingly, taking into account the fact that there was a shift operation pending starting from the previous write operation.

In various embodiments, this mechanism can require only an additional bit to cause the finite-state machine 108 to be able to support a three-state implementation (the finite-state machines that can be used in solutions such as that of FIGS. 4 and 5 envisage two states), all this without affecting in a negative way the benefits that can be achieved in terms of timing and of area occupation with the uncoupling of the write and shift operations.

Figure 9:
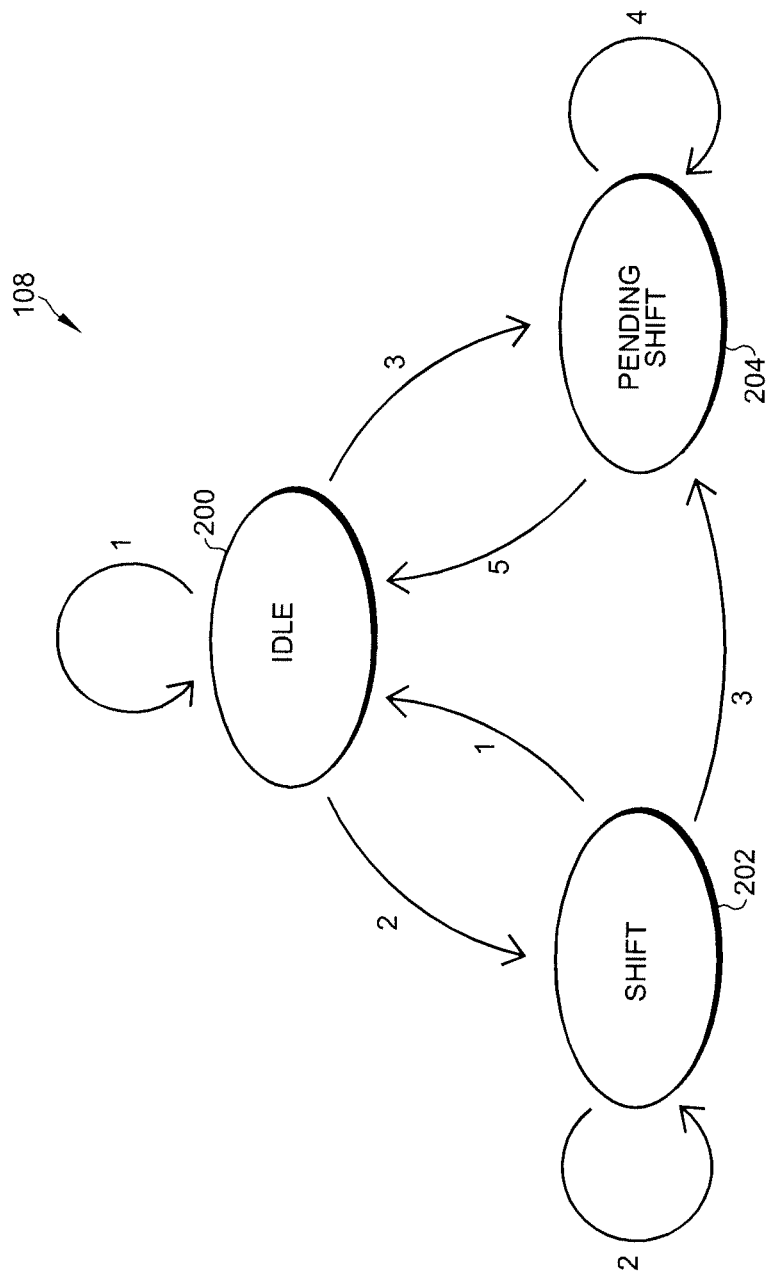
FIGS. 9 and 10 illustrate, at a graph level and at a level of functional flowchart, operation of embodiments.

The scheme of FIG. 9 is a graph representing the state-transition diagram of a possible embodiment of a machine 108 for implementing the mechanism described previously. The graph illustrates in detail the combinations of the signals responsible for the various transitions between the possible states.

These states are basically three, i.e., an inactivity or idle state 200, an active state 202, which governs actuation of the shift, and a wait state 204, which takes into account, in the presence of a FIFO structure completely full of data, as described previously, the fact that following upon the last possible writing operation there is a shift pending.

The write-enable signal (designated in the legend of FIG. 9 by wr_en) is responsible for the transitions to the shift states (i.e., for scheduling the shifts) 202 and 204. The choice for one or the other depends upon the condition of filling of the FIFO buffer (represented by the signal designated by last_free).

The read-enable signal (rd_en) determines the transition from the shift-pending state 204 to the idle state 200, updating the state when there is a reading operation with the FIFO structure full, thus enabling the shift.

All three states of the finite-state machine 108 control updating of the read pointer so as to maintain the consistency between the data written and the data read, with passage, according to the applicable condition, to the states 200, 202 or 204 when there are read events and to the state 202 when there are write events.

In various embodiments, the finite-state machine 108 can also perform the task of controlling generation of the grants to the write interface, enabling the operations of writing according to the state of the FIFO structure.

Figure 10:
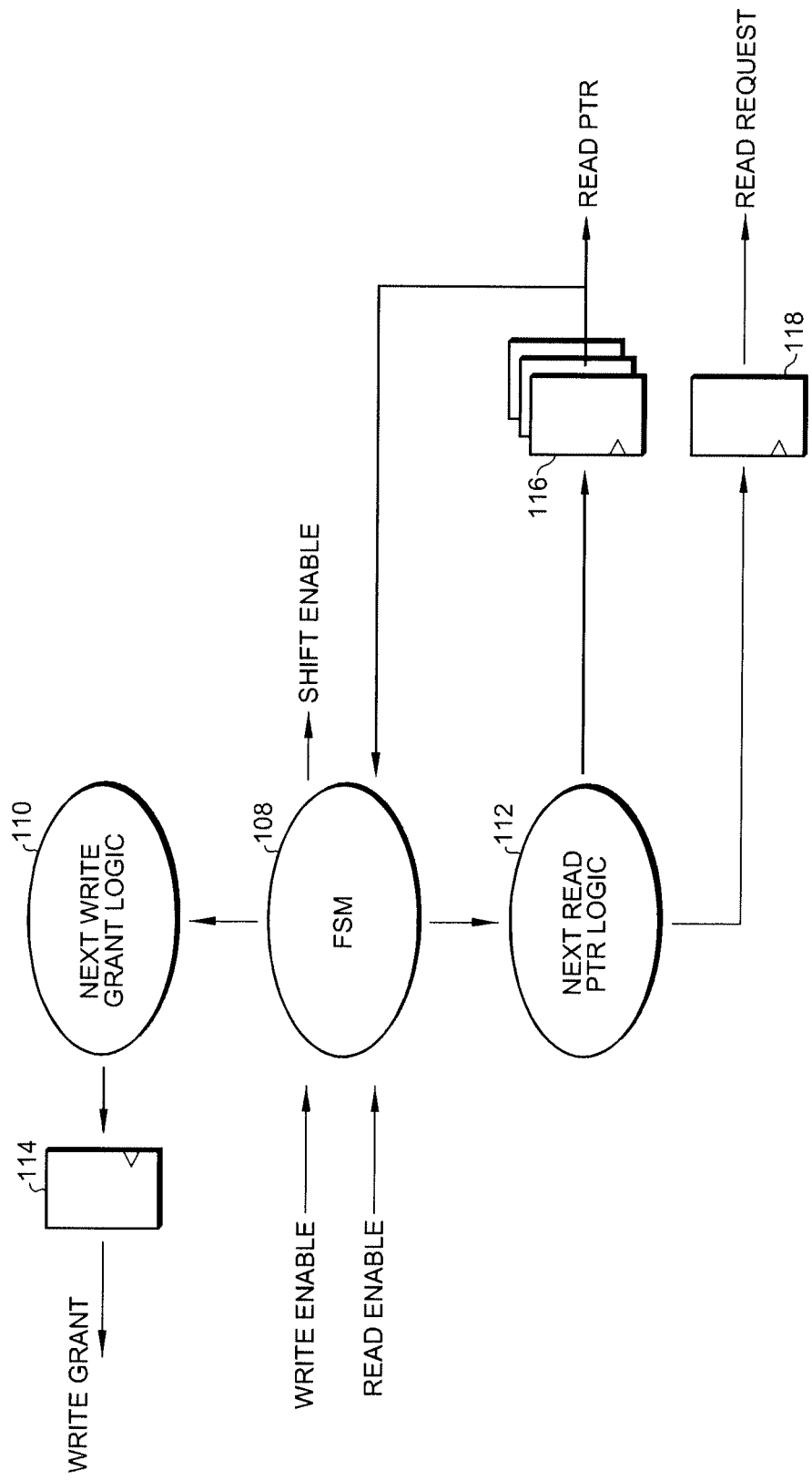

The block diagram of FIG. 10 represents a control logic that could be used, in various embodiments, in association with the finite-state machine 108.

The block diagram of FIG. 10 illustrates the fact that the finite-state machine 108 receives at input the write-enable and read-enable signals, issuing at output the shift-enable signal it being moreover possible to drive logic entities 110 and 112.

The first entity 110 supervises management of the grants to the subsequent writing operation intervening accordingly, for example, on a flip-flop 114 that generates at output the write-grant signal proper.

The entity 112 supervises management of the read pointers intervening on a set of logic elements such as, for example flip-flops 116, which generate the signal corresponding to the read pointer (read ptr), which is sent back also to the finite-state machine 108 for the reasons illustrated previously. The logic 112 moreover supervises, for example via another flip-flop 118, generation of the read requests.

Tests conducted by the present applicant show, for example, that in the case of an operation at a rate of 400 MHz in a context such as the one schematically represented in the figures of the annexed drawings, the worse violation in terms of timing (the so-called Worse Negative Slack—WNS) is, in various embodiments, altogether independent of the FIFO configuration.

Instead, in solutions such as those of FIGS. 1 to 5 there is a degradation of said performance (i.e., an increase in the negative slack), which increases as the dimensions of the FIFO increase in terms of number of locations.

Figure 2:
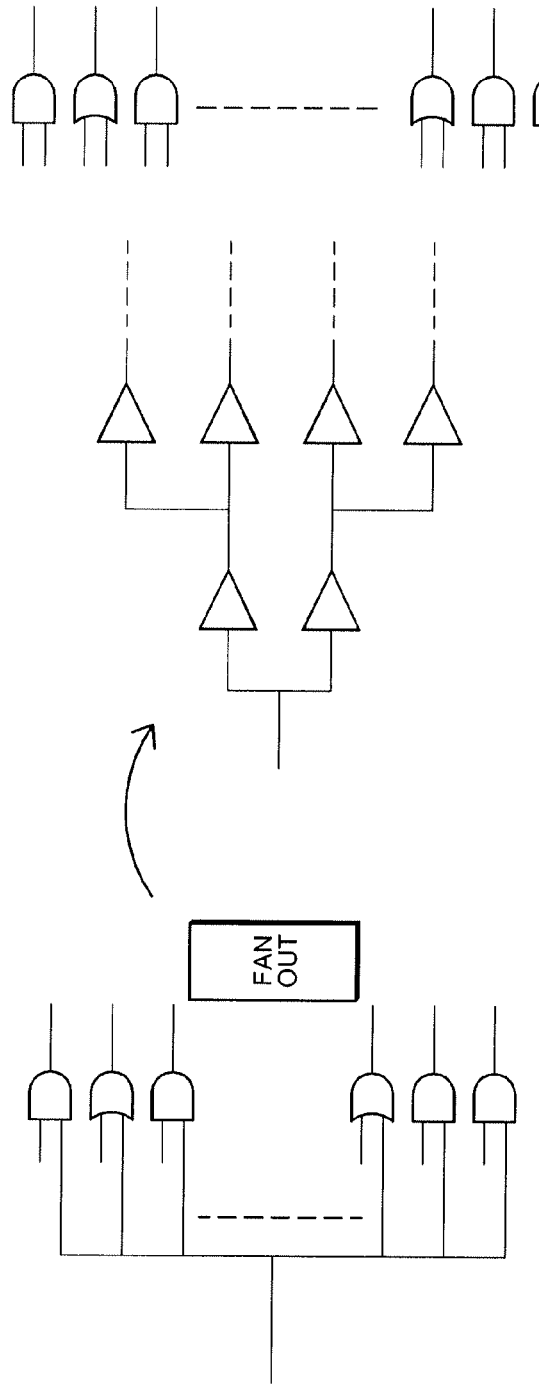

In particular, it may be noted that, by doubling the number of locations of the FIFO in solutions such as those represented in FIGS. 1 to 3 and in FIGS. 4 and 5, respectively, there is an exponential increase in the overall number of the violations of timing corresponding to all the circuit paths in violation, whereas in various embodiments of the solution considered herein said value remains constant or even decreases.

In various embodiments the improvement of the timing performance has a positive effect also from the standpoint of area occupation, since various embodiments require tree networks of buffer cells that are far less critical for driving the control signals with high fanout, hence with a reduced recourse to solutions for compensation and optimization of the timings, such as logic parallelism and duplication.

Of course, without prejudice to the principle of the invention, the details of implementation and the embodiments may vary, even significantly, with respect to what is described and illustrated herein purely by way of example, without thereby departing from the scope of the present invention, as defined in the ensuing claims.

We claim:

1. A method of controlling operation of a memory comprising a plurality of write locations, the method comprising:
    writing input data to the memory in a single write location among the plurality of write locations; and
    making the single write location available for writing new input data by shifting the input data written in the single write location to another write location among the plurality of write locations;
    wherein, at only each writing of input data in the single write location, scheduling the shifting at a next clock cycle without having to wait for a next input write operation.

2. The method of claim 1, wherein said shift of said data written in said single write location towards another location includes duplicating said data into said other location, whereby said data written in said single write location can be overwritten.

3. The method of claim 1, further comprising:
    a clocking operation of the memory with a clock signal arranged in subsequent cycles; and
    at each writing of input data in said single write location at a given clock cycle, scheduling said shifting of said data written in said single write location towards another location out of said plurality of locations for the subsequent clock cycle.

4. The method of claim 1, further comprising:
    detecting the condition wherein said shifting of said data written in said single write location towards another location is impossible, due to the locations in said memory different from said single write location being loaded with data still to be read from the memory;
    detecting reading of data from one of said locations in said memory different from said single write location; and
    effecting said shifting of said data written in said single write location towards another location out of said plurality of locations while re-enabling the possibility of writing data input to the memory in said single write location.

5. The method of claim 1, further comprising:
    controlling writing of data input to the memory in said single write location with a write control signal, and
    controlling the update of the locations of the memory different from said single write location by using a finite state machine.

6. The method of claim 5, further comprising providing in said finite state machine a state:
    towards which said machine evolves when detecting said condition wherein said shifting of said data written in said single write location towards another location is impossible; and
    from which said machine evolves when detecting said reading of data from one of said locations in said memory different from said single write location.

7. The method of claim 5, further comprising reading data from said locations in said memory with a pointer driven by said finite state machine.

8. A memory with a plurality of write locations configured for:
    writing data input in a single write location among the plurality of locations; and
    making the single write location available for writing a new input data by shifting the data written in the single write location to another write location among the plurality of write locations;
    wherein, at only each writing of input data in the single write location, scheduling the shifting at a next clock cycle without having to wait for a next input write operation.

9. The memory of claim 8, wherein said shift of said data written in said single write location towards another location includes duplicating said data into said other location, whereby said data written in said single write location can be overwritten.

10. The memory of claim 8, further comprising:
  a clocking operation of the memory with a clock signal arranged in subsequent cycles; and
  at each writing of input data in said single write location at a given clock cycle, scheduling said shifting of said data written in said single write location towards another location out of said plurality of locations for the subsequent clock cycle.

11. The memory of claim 8, further comprising:
  detecting the condition wherein said shifting of said data written in said single write location towards another location is impossible, due to the locations in said memory different from said single write location being loaded with data still to be read from the memory;
  detecting reading of data from one of said locations in said memory different from said single write location; and
  effecting said shifting of said data written in said single write location towards another location out of said plurality of locations while re-enabling the possibility of writing data input to the memory in said single write location.

12. The memory of claim 8, further comprising:
  controlling writing of data input to the memory in said single write location with a write control signal, and
  controlling the update of the locations of the memory different from said single write location by using a finite state machine.

13. The memory of claim 12, further comprising providing in said finite state machine a state:
  towards which said machine evolves when detecting said condition wherein said shifting of said data written in said single write location towards another location is impossible; and
  from which said machine evolves when detecting said reading of data from one of said locations in said memory different from said single write location.

14. The memory of claim 12, further comprising reading data from said locations in said memory with a pointer driven by said finite state machine.

15. The memory of claim 8, wherein said memory comprises a FIFO memory.

16. A non-transitory computer-readable medium having computer-executable instructions for causing a computer to perform steps comprising:
  writing data input to a memory in a single write location out of a plurality of write locations; and
  making the single write location available for writing a new input data by shifting the data written in the single write location to another location out of the plurality of write locations;
  wherein, at only each writing of input data in the single write location, scheduling the shifting at a next clock cycle without having to wait for a next input write operation.

17. The non-transitory computer-readable medium of claim 16, wherein said shift of said data written in said single write location towards another location includes duplicating said data into said other location, whereby said data written in said single write location can be overwritten.

18. The non-transitory computer-readable medium of claim 16, further comprising:
  a clocking operation of the memory with a clock signal arranged in subsequent cycles;
  and at each writing of input data in said single write location at a given clock cycle, scheduling said shifting of said data written in said single write location towards another location out of said plurality of locations for the subsequent clock cycle.

19. The computer program product of claim 16, further comprising:
  detecting the condition wherein said shifting of said data written in said single write location towards another location is impossible, due to the locations in said memory different from said single write location being loaded with data still to be read from the memory;
  detecting reading of data from one of said locations in said memory different from said single write location; and
  effecting said shifting of said data written in said single write location towards another location out of said plurality of locations while re-enabling the possibility of writing data input to the memory in said single write location.

20. The non-transitory computer-readable medium of claim 16, further comprising:
  controlling writing of data input to the memory in said single write location with a write control signal, and
  controlling the update of the locations of the memory different from said single write location by using a finite state machine.

21. The non-transitory computer-readable medium of claim 20, further comprising providing in said finite state machine a state:
  towards which said machine evolves when detecting said condition wherein said shifting of said data written in said single write location towards another location is impossible; and
  from which said machine evolves when detecting said reading of data from one of said locations in said memory different from said single write location.

22. The non-transitory computer-readable medium of claim 20, further comprising reading data from said locations in said memory with a pointer driven by said finite state machine.

\* \* \* \* \*